US008140855B2

(12) United States Patent
Zhu et al.

(10) Patent No.: US 8,140,855 B2
(45) Date of Patent: Mar. 20, 2012

(54) SECURITY-ENHANCED LOG IN (75) Inventors: Bin Benjamin Zhu, Edina, MN (US);
Min Feng, Beijing (CN); Aimin Pan,
Beijing (CN); Yuan Kong, Kirkland, WA
(US); Nathan C. Sherman, Bellevue,
WA (US); Hui Fan, Wuhan (CN); **Rui
Guo, Beijing (CN); Josh Benaloh**,
Redmond, WA (US)

(73) Assignee: Microsoft Corp., Redmond, WA (US)

( * ) Notice: Subject to any disclaimer, the term of this patent is extended or adjusted under 35 U.S.C. 154(b) by 786 days.

(21) Appl. No.: 12/101,166

(22) Filed: Apr. 11, 2008

(65) Prior Publication Data
US 2009/0260077 A1 Oct. 15, 2009

(51) Int. Cl.
G06F 21/00 (2006.01)
G06F 12/00 (2006.01)

(52) U.S. Cl. ............... 713/184; 713/185; 726/19

(58) Field of Classification Search .......... 713/184, 713/185, 186, 155; 726/4.7, 8, 9, 4, 7, 19
See application file for complete search history.

(56) References Cited

U.S. PATENT DOCUMENTS

| | | | |
|---|---|---|---|
| 5,887,131 A | 3/1999 | Angelo | |
| 6,055,592 A | 4/2000 | Smith | |
| 6,226,744 B1 | 5/2001 | Murphy et al. | |
| 6,470,454 B1 * | 10/2002 | Challener et al. | 726/17 |
| 6,687,836 B1 * | 2/2004 | Butler | 726/7 |
| 6,704,873 B1 | 3/2004 | Underwood | |
| 6,940,980 B2 * | 9/2005 | Sandhu et al. | 380/282 |
| 6,944,650 B1 | 9/2005 | Urien | |
| 6,996,718 B1 * | 2/2006 | Henry et al. | 713/182 |
| 7,028,192 B2 * | 4/2006 | Butler | 713/183 |
| 7,114,080 B2 * | 9/2006 | Rahman et al. | 713/186 |
| 7,197,765 B2 * | 3/2007 | Chan et al. | 726/8 |
| 7,228,424 B2 | 6/2007 | Raheman | |
| 7,296,160 B2 | 11/2007 | Hiltgen | |
| 7,367,063 B1 * | 4/2008 | O'Toole, Jr. | 726/34 |
| 7,484,241 B2 * | 1/2009 | Challener et al. | 726/5 |
| 7,500,272 B2 * | 3/2009 | Wheeler et al. | 726/34 |
| 7,602,910 B2 * | 10/2009 | Johansson et al. | 380/44 |
| 7,603,565 B2 * | 10/2009 | Baird et al. | 713/184 |
| 7,606,915 B1 * | 10/2009 | Calinov et al. | 709/229 |

(Continued)

OTHER PUBLICATIONS

Chang, et al., "An Efficient and Secure Remote Authentication Scheme Using Smart Cards", Cybercrime and Cybersecurity, An International Journal, ProCon Ltd., Sofia, Bulgaria, vol. 18, 2006, pp. 122-133.

(Continued)

Primary Examiner — Krisna Lim
(74) Attorney, Agent, or Firm — Lyon & Harr, LLP; Katrina A. Lyon (57) ABSTRACT

A security-enhanced login technique that provides a convenient and easy-to-use two factor technique to enhance the security of passwords without requiring any changes on the server side of a client-server network. The technique employs a convenient and easy-to-use two-factor technique to generate strong passwords for Web and other applications. In this technique, a convenient or personal device such as a mouse is used as the other factor besides a user password. A secret stored in the mouse or other personal device is hashed together with the password entered by a user and the server ID, to generate a strong, server-specific password which is used to authenticate the user to the server. This password enhancement operation is carried out inside the personal device.

19 Claims, 6 Drawing Sheets

U.S. PATENT DOCUMENTS

| | | | | |
|---|---|---|---|---|
| 7,669,057 | B2* | 2/2010 | Kelley et al. | 713/183 |
| 2002/0067832 | A1* | 6/2002 | Jablon | 380/277 |
| 2003/0163738 | A1* | 8/2003 | Couillard | 713/202 |
| 2004/0168068 | A1* | 8/2004 | Goal et al. | 713/184 |
| 2005/0114673 | A1* | 5/2005 | Raikar et al. | 713/182 |
| 2006/0041759 | A1* | 2/2006 | Kaliski et al. | 713/184 |
| 2007/0094715 | A1 | 4/2007 | Brown et al. | |
| 2007/0278291 | A1 | 12/2007 | Rans et al. | |
| 2008/0178252 | A1* | 7/2008 | Michaud | 726/1 |

OTHER PUBLICATIONS

"Mouse Uses Biometric Authentication to Secure PC Data", Jul. 6, 2007, http://news.thomasnet.com/fullstory/523200.

Kumar et al., "Using Continuous Biometric Verification to Protect Interactive Login Sessions", In Proc. of 21st Annual Computer Security Applications Conference, (ACSAC 2005), Dec. 5-9, 2005 pp. 1-10.

Chang, et al.,"An Efficient Multi-Server Password Authenticated Key Agreement Scheme Using Smart Cards with Access Control", Proceedings of the 19th International Conference on Advanced Information Networking and Applications (AINA'05), vol. 2, Mar. 28-30, 2005 pp. 257-260.

"Mouse Only Keyboard v1.4 (MOK)", http://www.myplanetsoft.com/free/mouse-only-keyboard.php.

Thomas Wu, "A Real-World Analysis of Kerberos Password Security", in Proceedings of Network and Distributed Systems Security (NDSS), San Diego, CA, Feb. 1999, pp. 1-10.

"Password Safe", http://passwordsafe.sourceforge.net/.

"Password Maker", http://passwordmaker.org.

"Password Composer", http://www.xs4all.nl/~jlpoutre/BoT/Javascript/PasswordComposer/.

Ross et al., "Stronger Password Authentication Using Browser Extensions", in Proceedings of the 14th USENIX Security Symposium, 2005,vol. 14, Baltimore, MD, pp. 1-2.

"Authentication in an Internet Banking Environment", Federal Financial Institutions Examination Council, Oct. 12, 2005, pp. 1-14.

Bellovin et al., "Password Based Protocols Secure Against Dictionary Attacks", Proceedings of the IEEE Symposium on Research in Security and Privacy,Oakland, May 1992, pp. 1-13.

Bellare et al., "Authenticated Key Exchange Secure Against Dictionary Attacks", Proceedings of EUROCRYPT '2000 May 18, 2000, Brugge, Belgium), Springer-Verlag (LNCS 1807), New York. pages 1-15.

Xie et al., "Quantifying Effect of Network Latency and Clock Drift on Time-Driven Key Sequencing.", Proceedings of 22nd International Conference on Distributed Computing Systems Workshops, 2002, Volume , Issue , 2002 pp. 35-42.

Lee et al., "A Flexible Remote user Authentication Scheme using Smart Cards", ACM SIGOPS Operating Systems Review. vol. 36, No. 3, 2002, pp. 46-52.

Chien et al., "An Efficient and Practical Solution to Remote Authentication: Smart Card", Computers & Security. vol. 21, No. 4, 2002, pp. 372-375.

Yoon et al., "Security Enhancement for Password Authentication Schemes with Smart Cards", Lecture Notes in Computer Science, 2005, pp. 311-320.

Ku et al., "Weaknesses and Improvements of an Efficient Password Based Remote User Authentication Scheme Using Smart Cards", IEEE Transactions on Consumer Electronics, vol. 50, No. 1, pp. 204-207, 2004.

Lee et al., "Improved Efficient Remote user Authentication Scheme using Smart Cards", IEEE Transactions on Consumer Electronics. vol. 50, No. 2, pp. 565-567, 2004.

Sun et al., "Improvement of Lee-Kim-Yoo's Remote User Authentication Scheme Using Smart Cards", Fuzzy Systems and Knowledge Discovery, Springer Berlin / Heidelberg, LNCS vol. 3614, pp. 596-599, 2005.

Yoon et al,"A New Efficient Fingerprint-Based Remote User Authentication Scheme for Multimedia Systems", LNCS vol. 3683, Springer-Verlag Berlin Heidelberg 2005, pp. 332-338, 2005.

"Anti-Phishing Working Group", www.antiphishing.org.

"Extended ASCII Codes", http://www.asciitable.com/.

"Anti Keylogger", www.anti-keylogger.net.

"Pharming.Org", http://www.pharming.org/index.jsp.

Wiegenstein, et al, "The Cross Site Scripting Threat", White paper, Version 1.2, Virtual Forge GmbH, 2007, pp. 1-30.

Provos, et al,"A Future-Adaptable Password Scheme", Proceedings of the FREENIX Track: 1999 USENIX Annual Technical Conference, Jun. 1999 pp. 1-12.

Halderman, et al, "A Convenient Method for Securely Managing Passwords", Proceedings of the 14th international conference on World Wide Web, Chiba, Japan, pp. 471-479.

"A Comprehensive Introduction to RSA SecurID User Authentication", RSA Solution Brief, RSA Security Inc., pp. 1-16.

* cited by examiner

SECURITY-ENHANCED LOG IN

BACKGROUND

Passwords are widely used in Web and other applications to authenticate a user to Web or other servers. With an increasing number of applications being available online, users must remember more passwords. For the sake of security, a password should be strong, i.e., it should have high entropy, in order to resist dictionary attacks. Additionally, different passwords should be used for different accounts to resist common password attacks in which adversaries use phishing sites or compromise a weakly protected server to obtain the password shared among several accounts. A strong password is hard to remember. Remembering and managing many strong passwords for several accounts is especially challenging. As a result, many people tend to use weak passwords and reuse the same password for many accounts. Password management is an increasingly important issue, especially for Web applications.

Several approaches have been proposed to help users manage passwords for both security and convenience. One approach allows a user to have different passwords for different programs and Web sites without having to remember their user names and passwords. It encrypts all user names and passwords by a master password, which is required to release an encrypted user name and password when logging into a server. Most browsers provide an "auto-complete" feature which securely saves users' passwords in a local password database for variable Web sites, and automatically completes the user name and password fields for the user when the user tries to log into the same Web page. Some approaches add a Web browser extension to generate different passwords for different Web sites from a single password entered by a user by hashing the user-entered password with a Web site's domain name. Password-based authenticated key exchange protocols are also proposed to protect against dictionary attacks by sniffing the login messages even if the password is of low entropy. These techniques require several rounds of exchanging messages. A server has to be modified to use such a type of technique.

The above techniques use a static password in user authentication. A more secure technique is to use dynamic passwords. One example of dynamic password generation uses a tamper-resistant carry-on device to generate a one-time password periodically, such as every 60 seconds. This approach requires time synchronization between a client device and the server.

Another way to enhance the security of user authentication is to use multiple factors. User authentication relies on one or more of the following three factors: something a user knows (e.g., a password), something a user has (e.g., a smartcard), and something a user is (e.g. a fingerprint). Password-based authentication is single-factor authentication, i.e., something that a user knows. U.S. federal banking regulators have concluded that a basic user ID and password are not enough to protect against fraud in on-line banking. In two-factor authentication, one factor is usually something one knows, such as a password, the other factor can be either something one has, such as a smartcard, or something one is, e.g., a fingerprint. Security is enhanced with two-factor authentication at the cost of higher deployment complexity and less user convenience. Biometric information is used in user authentication for certain applications, but is not suitable for many other applications since it is hard to renew biometric information once it leaks out. Smartcard-based password authentication has been actively studied recent years. Some techniques use a smartcard to compute a login credential from the user name and password entered by a user. In smart card security applications, complex calculation of exponentials is required, and the server has to be modified to support these authentication techniques. In addition, a smartcard reader is required. As a result, smart cards are not widely used in Web applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The security-enhanced login technique described herein provides a convenient and easy-to-use two factor authentication technique to enhance the security of passwords without requiring any changes at a server side of a network. In this technique, a convenient or personal device such as a mouse is used in addition to a password to log into a server. In one embodiment of the technique, a secret stored in the personal device (e.g., a mouse) is hashed together with a password entered by a user and the server's ID (e.g., in one embodiment, the source domain name for a Web server), to generate a strong password login to the server. The technique can be used as a client-side single sign on service which allows a user to remember only a single password to login in to different servers. The password for each server is strong and unique. The technique resists phishing attacks, common password and dictionary attacks, key loggers, and other cyber attacks.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the security-enhanced login technique, reference is made to the accompanying drawings, which form a part thereof, and which is shown by way of illustration examples by which the security-enhanced login technique may be practiced. It is to be understood that other embodiments may be utilized and structural changes may be made without departing from the scope of the disclosure.

1.0 Security-Enhanced Login Technique.

The security-enhanced login technique described herein provides a convenient and easy-to-use two factor technique to enhance the security of passwords without requiring any changes to a server in a server-client network. The technique employs a convenient and easy-to-use two-factor authentication scheme to generate strong passwords for Web and other applications. In this technique, a convenient or personal device such as a mouse is used as the other factor besides a user password. In one embodiment, a secret stored in the personal device (e.g., a mouse) is hashed together with the password entered by a user and the server ID (e.g., the source domain name for a Web application), to generate a strong, server-specific password which is used to authenticate the user to the server. This password security-enhancement operation is carried out inside the personal device (e.g., a mouse). For purposes of the following description, the personal device may often be described as a mouse. It should be realized however, that the personal device that contains the secret could be, for example, a keyboard, a cell phone, a USB drive or any other device that a user might readily take with them or have available to them. The secret stored in the personal device is never disclosed. In one embodiment of the security-enhanced log in technique, for Web applications, the generated security-enhanced password is passed to a Web browser extension to fill in a login form for the server with the generated security-enhanced password.

The security enhanced log-in technique has the following features:

- It requires no change to authentication servers. The technique works with all existing password-based authentication techniques without requiring any changes on the server side.
- It allows a single sign on. A user can use a single password to gain access to different servers (e.g. different Web sites). The password for each server is strong and unique.
- It provides for roaming. A user is able to use different computers to log into a server.
- It resists common password attacks and dictionary attacks.
- It provides for anti-phishing. The technique resists phishing attacks.
- It provides anti-keylogging protection. The technique is robust to keyloggers installed at the computing device a user uses.
- The technique supports multi-users on one computer.

The following paragraphs describe a typical exemplary environment where a password might be used; an exemplary architecture and exemplary processes in which the security-enhanced login technique can be practiced; and details and various embodiments of the technique.

1.1 Security Environment

Figure 1:
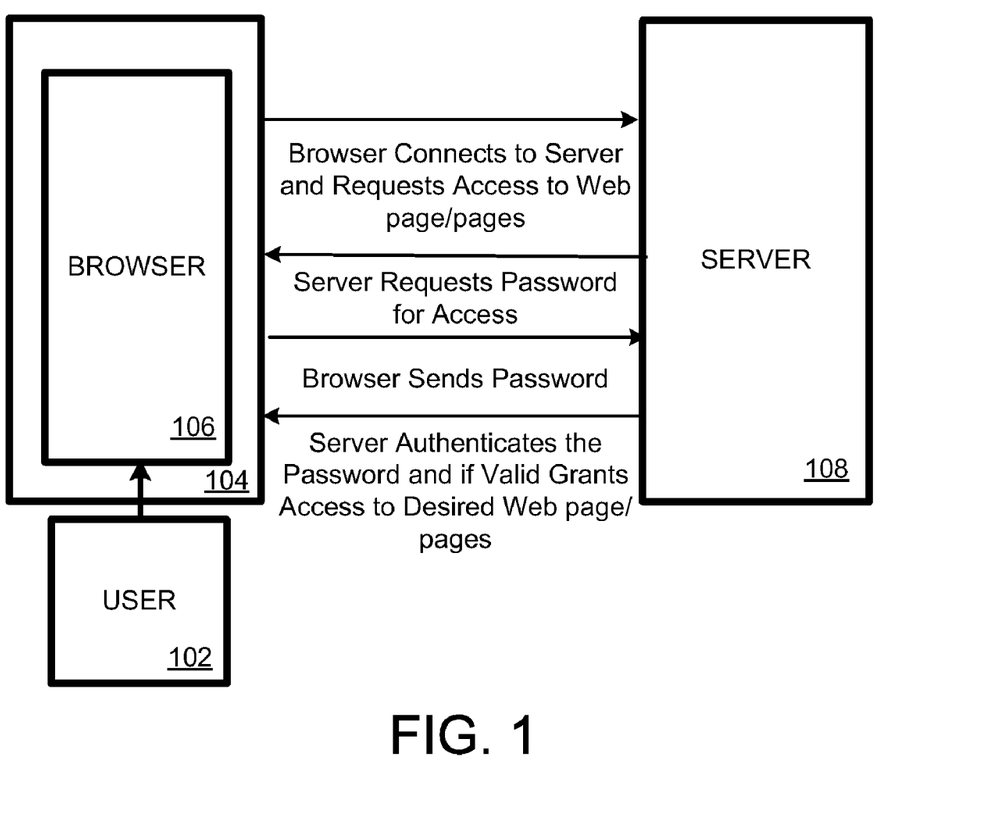
FIG. 1 provides an overview of one possible environment in which user authentication in a server client environment is typically carried out.

FIG. 1 provides an overview of an exemplary environment in which user authentication via a password takes place. A user 102 of a client computer 104 uses a browser 106 on the client computer to connect to a server 108 to request access to a Web page or pages. The server 108, if it requires user authentication for access, requests a password for access to the Web page or pages. The user 102, then enters a user-created password into the browser 106 which sends the user-created password to the server 108. The server 102, then authenticates the user-created password and if it is valid grants the user 102 access to the Web page or pages. If the user-created password is not valid, the server denies the user access to the Web page or pages. While FIG. 1 shows user authentication in a server-client environment, variations of this process can take place for any type of environment where a user password is required to gain access.

1.2 Exemplary Architecture

Figure 2:
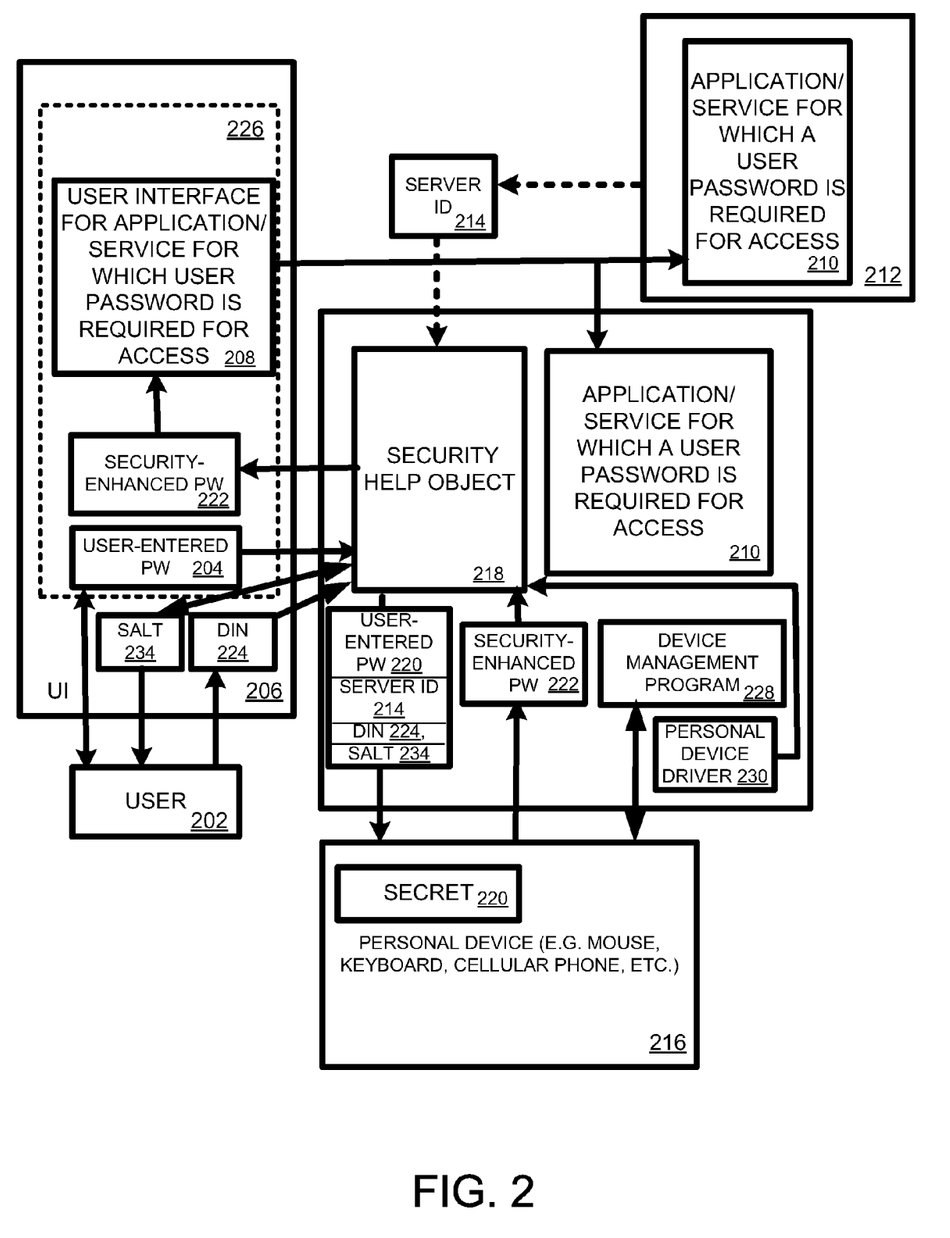
FIG. 2 is a diagram depicting one exemplary architecture in which one embodiment of the security-enhanced login technique can be employed.

One exemplary architecture 200 (residing on a computing device 600 such as discussed later with respect to FIG. 6) in which the security-enhanced login technique can be employed is shown in FIG. 2. In this exemplary architecture a user 202 enters a password 204 into a user interface 206 of a computing device 600 such as will be discussed later with respect to FIG. 6. The user interface 206 may also display the user interface 208 for the application or service 210 for which the user password is required. This application or service 210 may reside on a server 212 which the user typically would access via a browser 226. In the case where the application 210 resides on a server 212, the server may send a server ID 214 to a client's computing device 600 or the client's computing device can obtain the server ID 214 through some other means. When the user 202 enters a user password 204, this user-entered password is sent to a security help object (HO) module 218 on the client's computing device 600. The security help object module 218 sends the user-entered password 204 to a personal device 216, such as for example a mouse, which has a secret 220 stored thereon. The personal device (e.g., mouse) 216 uses the user-entered password 204 and the secret 220, and optionally the server ID 214, and generates a security-enhanced password 222, which it sends back to the security help object 218. In one embodiment, a cryptographic hash function can be applied to the user-entered password 204 and the secret 220, and optionally the server ID 214 to create a security-enhanced password 222. In one embodiment, the secret 220 is a 128 bit number. The security help object 218 sends the security-enhanced password 222 back to the user interface 206 where it is entered in place of the user password 204 that would normally be entered for the application/service for which the user password is required. The security-enhanced password 222 is much more secure and immune to attacks than the user-entered password 204.

In one embodiment of the architecture, an identification string otherwise termed as a Device Identification Number or DIN 224, which is used together with a salt 234 (a long random number that can be publicly known) generated by the security HO module 218 to generate the secret, is entered by the user into the user interface 206 and this DIN is passed to the security HO module 218. The salt 234 is displayed to the user 202 through a user interface 206. This salt is not necessarily protected. The user can store it at any convenient place such as a file, an email, or a Web page. The security HO 218 sends the DIN 224 and the salt 234 to the personal device (e.g., mouse) 216 which uses the DIN and the salt to generate the secret 220. By using the DIN 224 and the salt 234, the secret 220 can be cloned onto other personal devices 216. This allows a user 202 to use more than one computer to enter security-enhanced passwords for applications or services they usually frequent. The architecture may also include a device management program 228 which can be used to manage certain aspects of the personal device, such as changing the DIN 224. A personal device driver 230 may also be employed, as will be discussed in greater detail later.

In one embodiment of the architecture, the security HO module 218 applies a slow and complex function such as solving a reasonable hard problem to the DIN 224. The result is passed together with the salt 234 to the personal device (e.g., mouse) 216 which uses the two values to generate the secret 220. The advantage of this approach is that it is hard to apply a dictionary attack to deduce the security 220 or the DIN 224 even if the DIN 224 has low entropy and the procedure in generating the secret 220 is publicly known. Generating the secret 220 should run under a secure environment.

1.3 Exemplary Processes Employing the Security-Enhanced Login Technique.

Figure 3:
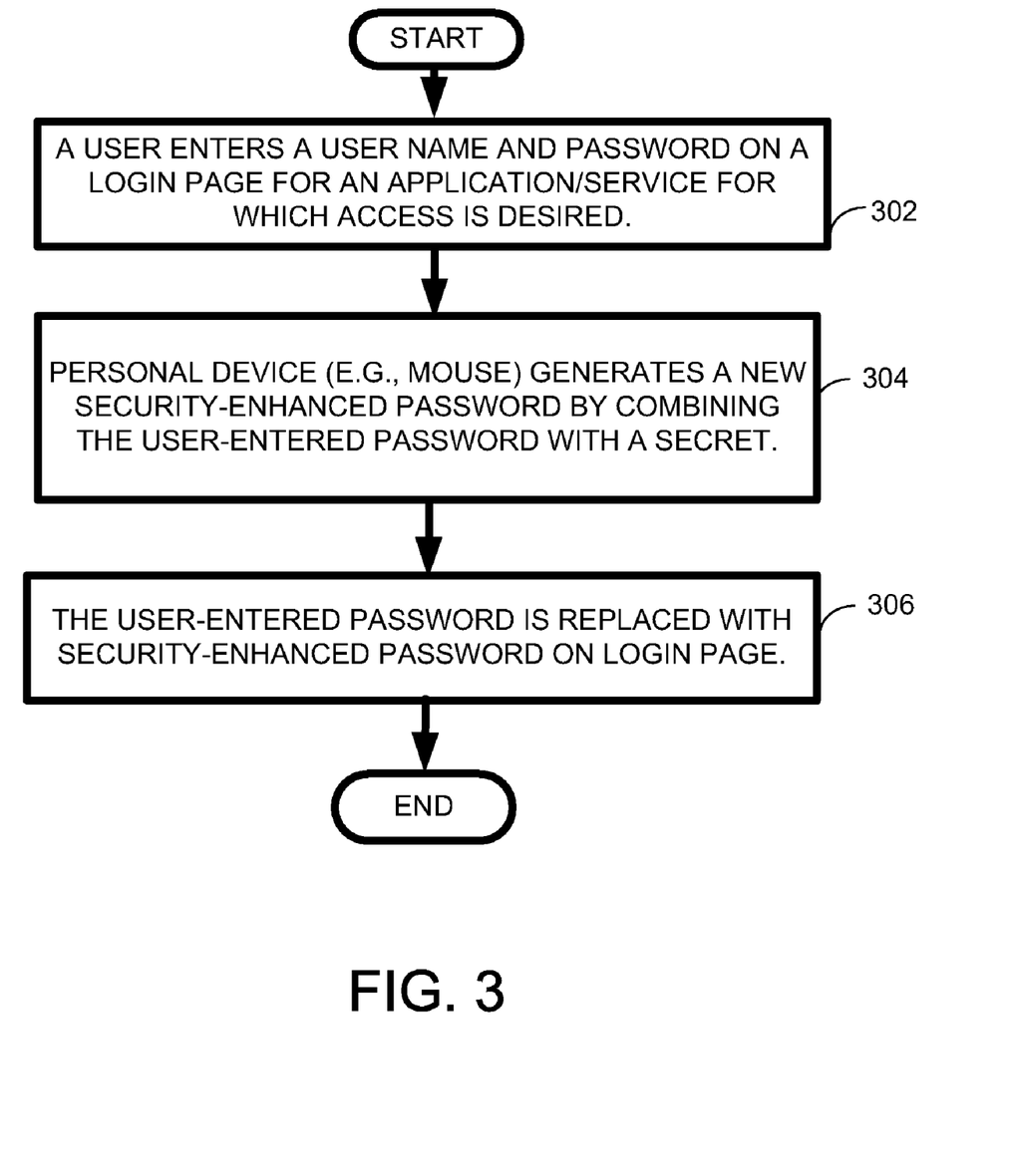
FIG. 3 is a flow diagram depicting a generalized exemplary embodiment of a process employing the security-enhanced login technique.

A very general exemplary process employing the security-enhanced login technique is shown in FIG. 3. As shown in FIG. 3, process action 302, a user enters a user name and a password at a login prompt for an application or service for which access is desired. The user-entered password is then hashed with a secret to generate a new security-enhanced password, as shown in process action of 304. The secret is an undisclosed string of characters-for example, in one instance it is a 128 bit number. This security-enhanced password is then used in place of the user-entered password to gain access to the application or service for which access is desired (process action 306).

Figure 4:
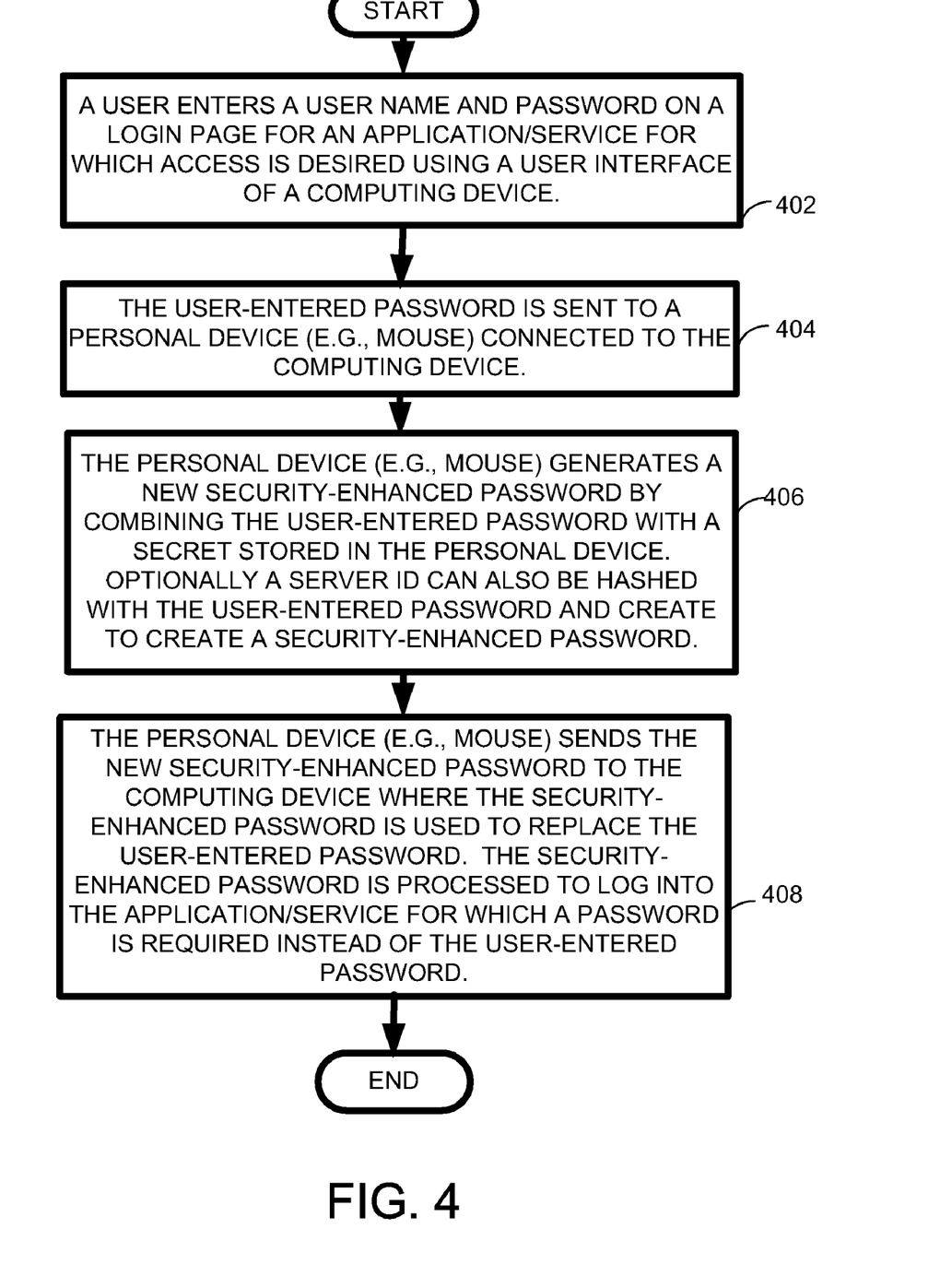
FIG. 4 is a flow diagram depicting another exemplary embodiment of a process employing the security-enhanced login technique.

FIG. 4 depicts another exemplary process employing the security-enhanced login technique. In this exemplary process, as shown in process action 402, a user enters a user name and a password on a login page for an application or service for which access is desired into the user-interface of a computing device. The user-entered password is sent to a personal device (e.g., a mouse) connected to the computing device, process action 404. The personal device calculates a new security-enhanced password by hashing the user-entered password with a secret stored in the personal device, process action 406. If the application or service for which access is desired is located on a server, an ID of the server can also be hashed with the user-entered password and the secret. The personal device then sends the new security-enhanced password to the computing device where the security-enhanced password is used to replace the user-entered password. The security-enhanced password is then processed to log in to the application or service for which a password is required to gain access (process action 408).

It should be noted that many alternative embodiments to the discussed embodiments are possible, and that steps and elements discussed herein may be changed, added, or eliminated, depending on the particular embodiment. These alternative embodiments include alternative steps, alternative functions (for example, alternative functions that can be used to combine elements instead of hash functions), and alternative elements that may be used, and structural changes that may be made, without departing from the scope of the disclosure. Some of these alternate embodiments are discussed in the paragraphs below.

1.4 Exemplary Embodiments and Details

The following paragraphs provide details and alternate embodiments of the exemplary architecture and processes presented above.

1.4.1 Password Enhancement

The following notation is used to describe some of the processing performed when employing some embodiments of the security-enhanced login technique:

| | |
|---|---|
| $S_X$: | Secret stored in a personal device (e.g., a mouse). |
| H: | Cryptographic hash function used to enhance passwords. |
| ⑂: | Appending operation. |
| $ID_S$: | ID of an authentication server. |
| $P_U$: | Password entered by a user. |
| $P_{ID}$: | The security-enhanced password for the server $ID_S$. |

As previously discussed with respect to FIG. 4, process action 406, in one embodiment, a strong password for a server is generated inside a personal device such as, for example, a mouse, from a user-entered password, a server's ID (e.g., the source domain name for a Web server), and a secret stored in the personal device. In one embodiment, to reduce complexity and cost, a simple cryptographic hash function is used. In this embodiment, the enhanced password for an authentication server $ID_S$ is generated in the following way:

$$P_{ID}=H(S_M ⑂ P_U ⑂ ID_S), \text{ and encoding } P_{ID} \text{ to meet the password syntax if needed} \qquad \text{Equation (1)}.$$

The encoding method depends on the specific requirement of the server for a password. For example, if the server allows that a password consists of only letters and numbers, then the hash value can be converted to a string of letters and numbers with a Base64 encoding, with non-letters and non-numbers being dropped. The result may need to be truncated to meet the maximum length, e.g. 16 alphanumeric characters, requirement for a password.

With Eq. (1), different passwords are used for different servers even if a user enters the same password. A security-enhanced password is a strong password. A few variations of Eq.(1) can also be used. For example, the user name of an account can be included in the hash function. This allows different accounts with the same server to share a single user-entered password, yet different passwords are generated for different accounts. For some applications such as Web applications, it may be hard to identify the user name automatically. Due to this problem, the user name is not used in one embodiment of the basic technique as expressed in Eq. (1).

It is also possible to add server-specific seeds in Eq. (1), with the seeds for different servers being stored and managed by the personal device (e.g., mouse). This modified technique is more secure: to deduce the password used to authenticate a user to a server, an adversary needs to apply the correct target server's seed used in generating the enhanced password. It has another advantage: each server's enhanced password can be updated individually with a new seed for the server without changing the global secret $S_M$. The drawback is the complexity to synchronize those seeds among all the cloned personal devices. Cloned personal devices share the same secret. For example, cloned mice might be needed if a user wants to log into the same server from different computers such as home and office computers without carrying a mouse from one computer to another.

1.4.2 Personal Device Initialization and Secret Generation

A user often wants to use both office and home computers to access the same server without moving a personal device, such as, for example, a mouse, from one computer to another. An easy way to do so in the security-enhanced login technique is to clone a personal device (such as, for example, a mouse) so that both the office computer and home computer use identical devices. For example, if the personal device is a mouse, when a mouse is lost, a user should be able to easily recover the secret stored in the lost mouse and update the secret. As shown in FIG. 2, to reduce the management complexity, the security-enhanced login technique lets a user 202 generate the secret 220 from a secret device identification string or number (DIN) 224 that the user enters together with a salt 234 that can be publicly known. The device identification string 224 can be a string of alphanumeric characters.

A personal device 216 (e.g., mouse) needs to be initialized before usage. A secret 220 is generated from the DIN 224 entered by a user 202 and a salt 234 generated by a computer, and then the secret 220 is stored in the personal device 216.

This process should preferably be performed in a secure environment. To reduce the risk of dictionary attacks, when a user 202 chooses a simple DIN 224, the secret generation mechanism should preferably be undisclosed or very slow. The technique can adopt one of the several approaches to do this. A first approach is that each personal device 216 contains a secret hash function which is used to generate the secret 220 from a DIN 224 and a salt 234. This hash function should preferably be different from H, the hash function used to enhance passwords. Since this hash function is not disclosed, an adversary cannot try different DINs 224 in a dictionary attack. Its drawback is that once the hash function is compromised by reverse-engineering of a personal device's hardware, an adversary can launch a dictionary attack on the DIN 224. Another approach is to use a complex and slow function to generate an output from a DIN 224. The output is then hashed together with a salt 234 to generate the secret 218. The hash function runs inside a personal device (e.g., mouse), and the complex function runs on a trusted PC or a trusted server. When running on a server 212, a user 202 can use a secure channel to submit his DIN 224 to the server.

As shall be seen in subsequent sections, a personal device 216 can store other data too. Those data (excluding the secret 220) can be backed up to a computing device, and are not necessarily protected. To clone a personal device 216 (e.g., mouse), the same DIN 224 and salt 234 are used to initialize a new personal device 216 (e.g., mouse), and then the data stored in the old device is transferred to the new device. When recovering from a lost personal device, a new personal device is initialized with the same DIN and salt, and the data backed up in the computing device is copied to the new personal device. For security reasons, a user should then change the secret by using a DIN different from that in the lost personal device, and update all the passwords that have been enhanced with the lost personal device.

1.4.3 Roaming

A user may access the same server from different computers. To enable roaming, the user can carry a personal device such as a mouse around, and use his "personal" device (e.g., mouse) whenever he wants to access a server. It is also possible to clone a personal device so that different computers use identical personal devices (e.g., mice). A third solution is to use a small device detachable from a personal device such as a mouse. The detachable device contains the logic to perform the required functions of the security-enhanced login technique inside a personal device, and stores the secret and other data as necessary. A user can carry the detached device with him, and attached it to a personal device (e.g., mouse) when he uses a computer. The personal device that the detachable device attaches to should be trusted, otherwise the enhanced passwords generated by the detachable device are disclosed.

1.4.4 Multiple Users

In many cases a mouse would not be considered as a personal device. It is usually attached to a computer that other users may use. It is also desirable to prevent a lost or stolen mouse from being used by others. In the security-enhanced log in technique, in one embodiment, a user needs to enter a Personal Identification Number (PIN) the first time they use the personal device to security enhance passwords in a session. In one embodiment, the session expires if the personal device is not used (for either normal usage or password enhancement) for a period of time longer than a threshold settable by the user. Different PINs can be associated with different secrets. A personal device can organize secrets and stored data according to PINs. If a user enters wrong PINs more than a reasonable number of times (such as, for example, five times), a personal device can lock itself from being used for password enhancement for a certain period of time while its normal functions are still operational.

Another method of activating enhanced-security password processing, where the personal device is a mouse, is to use a user-selected combination of left and right mouse clicks as the PIN to activate a mouse's password enhancement function. A light on the mouse can indicate its session status. If the session is active, i.e., the mouse can enhance passwords, the light is green. Otherwise it is red. In one embodiment a user needs to activate the mouse for password enhancement by pressing the right combination of left and right mouse clicks to identify the user to the mouse, for example, a combination as: three left clicks, followed by two right clicks, and then one left click and one right click.

1.4.5 Embodiment for Web Applications

Referring to FIG. 2, a typical application scenario for the technique is to enhance a password in Web authentication. In this section, the detail of an embodiment of the technique that works with a browser 226 for Web applications is described. One embodiment of the technique does not require changes to Web servers. In fact, a Web server typically does not know if a password is security-enhanced. Other types of applications can be implemented in a similar manner.

In one embodiment, two components are installed on a client computer 600: a security Help Object (HO) 218 that extends a Web browser and a personal device driver 230. In one embodiment, in addition to providing personal device functions, such as, for example, mouse functions if the personal device is a mouse, the driver 230 uses proprietary protocols to talk to the personal device 216 as well as the security HO 218 for password enhancement. A Web login procedure with an enhanced password for one embodiment of the enhanced security login technique can be described as follows. A user 202 enters a user name and a password 204 on a login Web page as usual. The security HO 218 sends the user name and password 204 as well as the source domain name to the personal device 216. The personal device 216 uses Eq. (1) to calculate a new security-enhanced password 222, and returns it to the security HO 218, where $ID_S$ is the source domain name of the login Web page or frame. The security HO 218 replaces the password value in the form's password field with the security-enhanced password 222 which is then processed as the user-entered password in a Web login process without the technique.

1.4.5.1 User Interface

Figure 5:
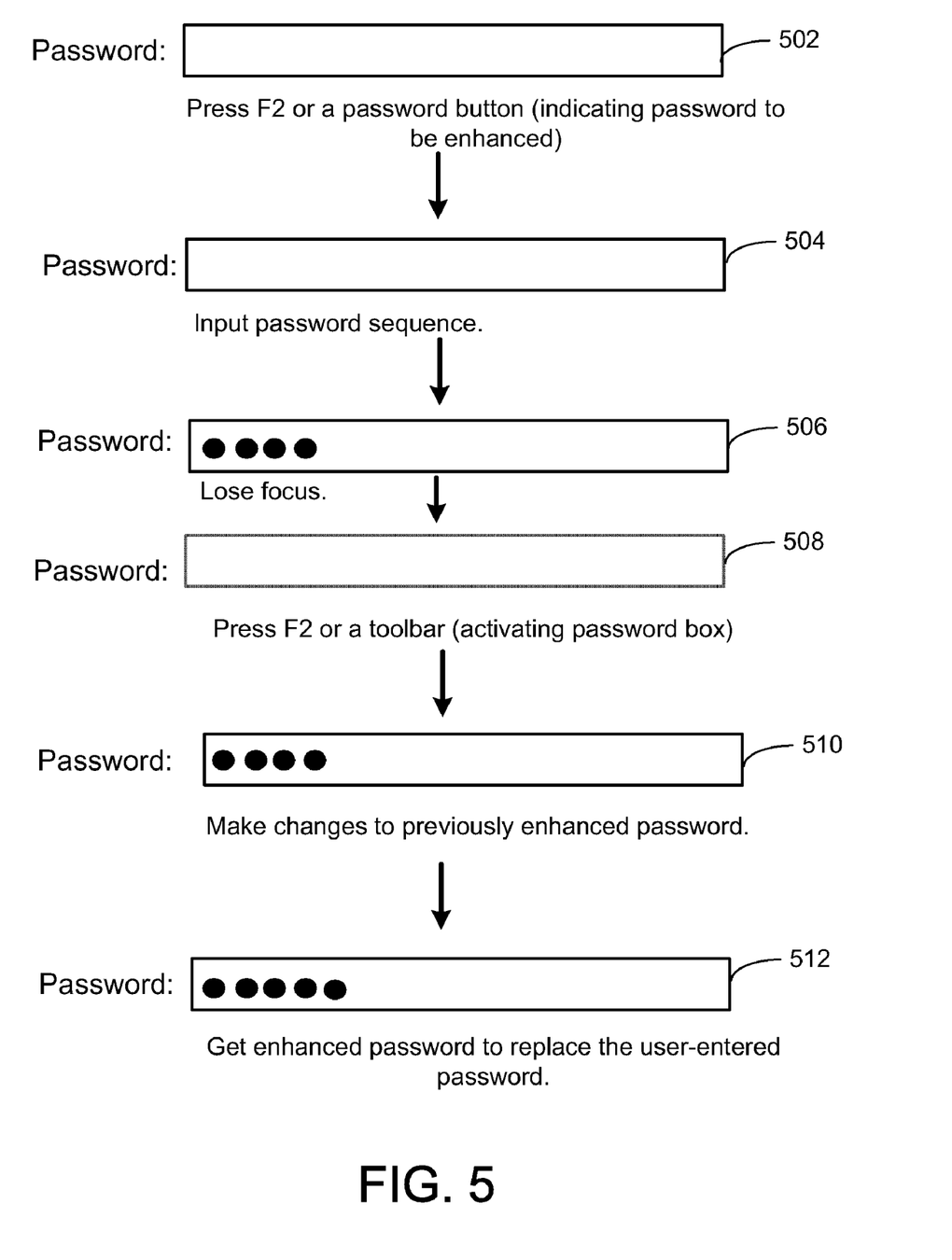
FIG. 5 is a user interface for creating a security-enhanced password employed in one embodiment of the security-enhanced login technique.

By default, in one exemplary embodiment of a user interface of the security-enhanced login technique, all password boxes in a Web page have the normal behaviors, looks and logics. As shown in FIG. 5, when a user enters a password that is going to be enhanced in one embodiment of the technique, the user focuses on the password box, and then activates a control (e.g., presses F2 or clicks the password button on the browser's toolbar) to indicate that it is an enhanced password box (box 502), i.e., the password entered into the password box will be enhanced. The password box changes to a different display style such as using a different color and a bolder border (box 504). The user then enters their password in the highlighted password box (box 506). Once the password box loses its input focus, the password box turns to half transparent and inactivated. The browser's password button changes accordingly to indicate that the password box is out of focus. The user can then activate the control (e.g., press F2 or click the password button) to focus on the password box again to continue entering password or to make changes to the password he has entered (boxes 508, 510). Activating the control (e.g., pressing F2 or clicking on the password button) on an input box other than a password box will result in an error message indicating that the input box is not a password box, and the user should not enter any passwords in that input box. The security-enhanced password is shown in the same disguised manner in the input box as a regular password would be once entered (e.g., all circles or masked characters) (box 512).

The design indicates to a user which input box to enter a password to be enhanced and uses different display styles for the activated and inactivated password box to prevent a phishing site from tricking a user to enter a password in an input box not to be enhanced by drawing an input box with the same appearance as an enhanced password box. Otherwise the password entered by a user might be disclosed under a phishing attack. As mentioned previously, a secret is used to generate a password to log into a Web site. In one embodiment, the secret is a random number of 128 bits or longer. (However, other types and lengths of secrets can be used). It is hard to launch a dictionary attack to deduce the secret and then to generate the right password for a Web site. Nevertheless, the technique provides mechanisms to protect the password entered by a user from phishing or access by scripts.

In one embodiment of the security-enhanced login technique, the source domain name of a login frame, user name, and the password box ID are stored in the personal device. When the user accesses the same login page again in the future, and enters the same user name, the password box will be automatically displayed as an inactivated enhanced password box to indicate that the password entered to the box was enhanced in the past and should be enhanced this time too. The user can activate the password box by activating the control (e.g., pressing F2 or clicking the password button), and enter the password in the password box. If a password is not enhanced with the security-enhanced login technique, the user enters their password as usual. The password button on a Web browser also allows a user to choose if a password box is to be enhanced or not. The technique allows a user to have some Web sites' passwords security-enhanced with the technique, while other Web sites' passwords remain untouched. It also indicates which Web site's password has been security-enhanced in the past so that a user does not have to remember which Web site needs an enhanced password and which Web site does not.

1.4.5.2 Security Help Object

The security help object (HO) protects the user-entered password and the enhanced password from various attacks such as phishing and key logging launched either from a malicious Web site or a locally running malicious program. It minimizes impacts on legitimate operations on a password. In one embodiment, the security HO listens to certain events of each hypertext markup language (HTML) form which contains one or more password boxes requiring enhancement. When such an event occurs, the value in each enhanced password box in the corresponding HTML form is sent to the personal device (e.g., mouse), which enhances the password (e.g., with Eq. (1)) and returns the result to the security HO. The security HO replaces the original password with the enhanced password. This allows a Website to use client side scripts to process a password.

In one embodiment of the security-enhanced login technique, the security HO listens to a set of events for every enhanced password box in order to handle inputs to the password box before any scripts. In this embodiment, the security HO's input processing logic is called after every basic input action before any scripts. For example, in this embodiment, the basic input actions that a user can take on a password box include: character insertion; character deletion (may be initiated with "DEL" or "Backspace"); character overwrite; delete selection (may be initiated with "DEL", "Backspace", or a mouse click on the "delete" item of the password box's context menu); paste characters (may be initiated with a "Ctrl+V" or a mouse click on the "paste" item of the password box's context menu); and drag and drop characters into the password box. In one embodiment, the security HO records the user input into its memory and replaces the user input to a password box to be enhanced with the mask characters selected sequentially from an ordered set of mask characters never being used in any password after each basic input action. By comparing the resulting input with the previous masked input, the security HO can deduce the positions and values of the user input in the current basic input action, and updates its recorded user input accordingly. The security HO then replaces the resulting string in the password box with mask characters selected sequentially from the ordered set of mask characters, starting from the first one, so that it can detect the user input in the next basic input action. Scripts can see only the mask characters with the actual user input replaced by the security HO.

1.4.5.3 Auto-Complete

In one embodiment of the technique, a browser's typical auto-complete feature is disabled by the security HO. Instead, the security HO offers the same auto-complete feature to a user by storing the relevant information in the personal device. In one embodiment of the technique, the password entered by a user can be stored in the personal device (e.g., mouse) as well as the enhancement status to indicate if the password is enhanced or not. The password and the enhancement status are encrypted with the secret. Other information, such as the user name or domain name, is not encrypted.

In one embodiment, when a user inputs a user name into a login Web, the security HO retrieves the stored account names for the same domain from the personal device, and displays them for the user to choose. Once a user name is selected, the corresponding password is decrypted and sent to the security HO. The security HO fills the password box with the retrieved password if the retrieved enhancement status indicates that the password was not enhanced, or with a string of mask characters of the same length as described previously when the password was enhanced.

1.4.5.4 Registration and Changing Password

In most cases, using a security-enhanced password is very similar to what was described previously. For example, in one embodiment, when a user registers an account to a Web site, he does everything as usual except that he needs to activate a control (e.g., press F2 or click the password button) before entering a password to be enhanced. This is also true in changing an old password to a new one: the passwords that need to be enhanced should be entered after activating the control, while those without being enhanced are entered directly. Note that both the old and new password will be hashed with the same secret if both passwords are enhanced.

In one embodiment, when a personal device containing a secret is used for the first time to enhance a password, a user needs to change the existing password with each Web site that he wants to use enhanced password. This is done as in changing an old password to a new one, with the old one un-enhanced and the new one enhanced.

If the password to be changed is remembered by the personal device (e.g., mouse) for the auto-complete feature, the password and the relevant information such as user name and domain name should be deleted from the personal device by using a device management program or updated when asked if a user wants to save the entered password for auto-complete in a subsequent use.

1.4.5.5 Changing the DIN

A user may want to change a personal device's DIN, for example, when his personal device (e.g., mouse) is lost or stolen. The user preferably uses a trusted computing device to run a device management program 228, such as that shown in FIG. 2. With this program, a user can delete or generate a secret associated with a DIN, and mark a secret's status: past or current. Before these operations, the personal device needs a user to enter the correct DIN and salt which generate a secret that matches the one the user wants to operate on. A personal device never reveals the value of a secret to the management program. In addition to manage secrets, the management program also manages any stored data: deleting items and backing up stored data. Again stored data does not include any secret. Secrets are treated as intrinsic data inside a personal device and are never disclosed. Stored data, on the other hand, can be sent to a computing device.

In one embodiment, in changing a DIN, a user first uses the device management program to generate a new secret with a new DIN and a salt of either old or new, and to mark the new secret as current and the old secret as past. The user then updates their password with each Web site for which they have used security-enhanced passwords. In one embodiment of the technique, on the Web page to change a password, the user gets a password box focused, and then presses F2 or Shift+F2 to indicate that the password box is to be enhanced with the current or old secret. The user can also click the password button on the Web browser's toolbar to select from the pull-down menu if the password is to be enhanced with the old or current secret. In one embodiment, the pull-down menu associated with the password button on the Web browser's toolbar allows a user to select if the focused password box is to be enhanced or not, or to be enhanced with the old or current secret if both old and current secrets are stored in the device. The pull-down menu facilitates easy updating of a Web server's password or a secret stored in a device. In one embodiment, pressing F2 when a password box is focused indicates the password is to be enhanced with the device secret or the current device secret if the device contains both old and current secrets, and pressing Shift+F2 (pressing Shift button and F2 together) when a password box is focused indicates that the password is to be enhanced with the old device secret. It would produce an error message if Shift+F2 are pressed when the device does not have both the old and current secrets. The password button and a password box can have different display style to indicate the status of the password box, such as focused or not, as described in paragraph [0036] or shown in FIG. 5. Once the user clicks the "submit" button, the security HO sends the passwords as well as their status (i.e., old or new) to the personal device which generates enhanced passwords with the corresponding secrets. Once all the Web sites have been updated, the user can delete the old secret from the personal device.

In one embodiment, by using the management program, a user also should to update the user-entered passwords and their enhancement statuses encrypted with the old secret to those encrypted with the new secret. Other data stored in the personal device does not change.

1.4.5.6 Stored Data

In addition to storing data for the auto-complete feature, the domain name and user name associated with an enhanced password are also stored in a personal device in one embodiment of the security-enhanced login technique. These data can be backed up to a computing device for future use such as in cloning a personal device or in restoring a lost or stolen personal device.

1.4.5.7 Protecting Modules on the Computing Device

In one embodiment of the security-enhanced login technique, two modules, a personal device driver (e.g., FIG. 2, 230) and the security HO, run on a computing device to enhance passwords. In one embodiment, the technique uses proprietary methods to communicate between the personal device driver and the personal device, and between the security HO and the personal device driver. For example, simple XOR-based encryption with hard-coded keys shared between the security HO and the personal device driver can be used to encrypt messages between the security HO and the personal device driver. In one embodiment, when the security HO is launched, a random key is used to generate a pseudo-random sequence to encrypt the passwords that the security HO stores temporarily in its memory for processing. Further protection technologies can also be used.

1.4.5.8 Additional Security Features

Additional security features can be employed in various embodiments of the security-enhanced login technique. For example, in one embodiment, the personal device (e.g., a mouse) can store the hash values of the passwords a user has entered for enhancement. The security HO monitors input to each input box; if it detects that a string entered into an input box has the same hash value as one of the passwords that the user entered to an enhanced password box in the past, the security HO alerts the user to this, and informs them that the password might be disclosed. In one embodiment of the technique, a user can specify if this additional security measure should be activated or not.

2.0 The Computing Environment

The security-enhanced login technique is designed to operate in a computing environment. The following description is intended to provide a brief, general description of a suitable computing environment in which the security-enhanced login technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 6:
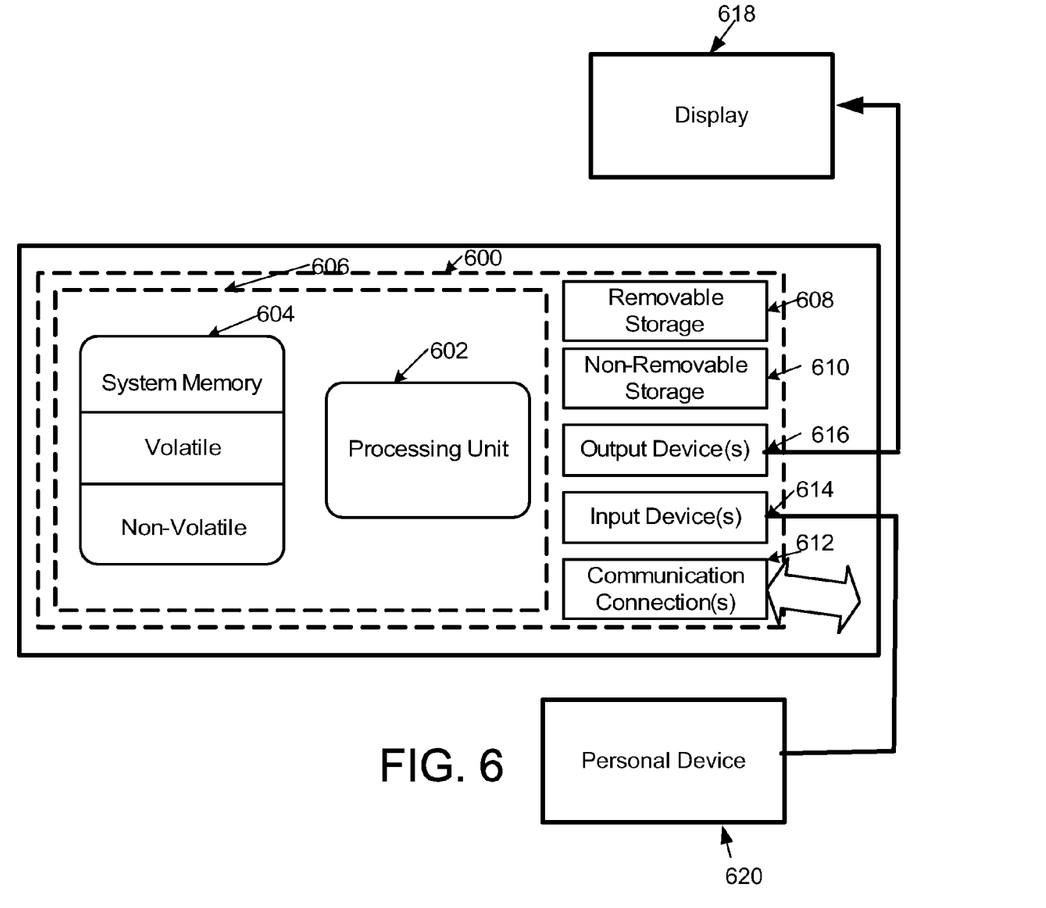
FIG. 6 is a schematic of an exemplary computing device in which the present security-enhanced login technique can be practiced.

FIG. 6 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 6, an exemplary system for implementing the security-enhanced login technique includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Device 600 has a display 618 and a personal device 620 with a secret embedded (for example, a mouse, keyboard, USB device, cellular phone, PDA), and may also contain communications connection(s) 612 that allow the device to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may have various input device(s) 614 such as a keyboard, mouse, pen, camera, touch input device, and so on. Output device(s) 616 such as speakers, a printer, and so on may also be included. All of these devices are well known in the art and need not be discussed at length here.

The security-enhanced login technique may be described in the general context of computer-executable instructions, such as program modules, being executed by a computing device. Generally, program modules include routines, programs, objects, components, data structures, and so on, that perform particular tasks or implement particular abstract data types. The security-enhanced login technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for enhancing the security of a user-created password, comprising:
    entering a user password at a login prompt for an application for which access is desired on a user-interface of a computing device;
    combining the user-entered password and a secret comprising an undisclosed string of characters stored in a personal device that can be connected to the computing device to generate a new security-enhanced password; and
    replacing the user-entered password with the security-enhanced password to gain access to the application for which access is desired.

2. The computer-implemented process of claim 1 wherein combining the user-entered password and a secret comprises applying a hash function to the user-entered password and the secret to generate the security-enhanced password.

3. The computer-implemented process of claim 1 wherein the personal device is a mouse.

4. The computer-implemented process of claim 1 wherein the personal device is a cellular phone.

5. The computer-implemented process of claim 1 further comprising generating the secret from a device identification string provided by a user.

6. The computer-implemented process of claim 5 further comprising generating the secret by using a hash function to hash the device identification string provided by the user and a salt.

7. The computer-implemented process of claim 5 further comprising generating the secret by hashing a salt and the output of applying a complex and slow function to the device identification string provided by the user.

8. A computer-implemented process for enhancing the security of a user password to access information on a computing device on a computer network, comprising:
    entering a user-created password into a user interface of a computing device for a service for which access is desired;
    sending the user-entered password to a personal device connected to the computing device;
    combining at the personal device the user-entered password and a secret stored in the personal device to generate a new security-enhanced password;
    sending the new security-enhanced password from the personal device to the computing device where the security-enhanced password is used to replace the user-entered password; and
    using the security-enhanced password to log in to the application or service for which access is desired.

9. The computer-implemented process of claim 8 wherein combining the user-entered password and the secret stored in the personal device comprises applying a hash function to the password and secret to generate the new security-enhanced password.

10. The computer-implemented process of claim 9 wherein the service for which access is desired is located on a server and wherein an ID of the server is hashed with the user-entered password and the secret to create the security-enhanced password.

11. The computer-implemented process of claim 10 wherein the server ID is the source domain name for a Web server.

12. The computer-implemented process of claim 8 further comprising generating the secret using a user-specified string.

13. The computer-implemented process of claim 12 further comprising generating the secret by using a hash function to the user-specified string and a salt.

14. The computer-implemented process of claim 8 wherein the user-interface further comprises a control to activate the security-enhancement of a password.

15. The computer-implemented process of claim 8 further comprising a process action for preventing user input characters from becoming known by a script when accessing a Web site on the network by replacing user input characters of the user-created password with unrelated characters before a script accesses the user input characters, comprising:
  after each current user input action, storing the current user input securely in a place inaccessible by scripts;
  before a script accesses the current user input, replacing the current user input with new mask characters sequentially selected from an ordered set of mask characters never used in user input;
  using the positions of the new mask characters to detect the current user input;
  updating previously-entered user input with the current user input to obtain a resulting user input;
  storing the resulting user input securely in a place inaccessible by scripts;
  replacing the string of mask characters with another string of mask characters sequentially selected from the ordered set of mask characters, starting from the first mask character in the set.

16. A system for enhancing the security of a login process to access information on a network, comprising:
  a general purpose computing device;
  a computer program comprising program modules executable by the general purpose computing device, wherein the computing device is directed by the program modules of the computer program to,
    receive a user-entered password at the computing device;
    transferring the user-entered password from the computing device to a personal device that contains a secret string;
    combining the user-entered password with the secret string to create a security-enhanced password; and
    using the security-enhanced password instead of the user-entered password to access a password-protected, entity.

17. The system of claim 16 further comprising a program module to create the secret string from a user-created device identification string.

18. The system of claim 16 wherein the password protected entity resides on a second computing device and wherein an identification tag of the second computing device is combined with the user-created password and the secret string to create the security-enhanced password.

19. The system of claim 16 wherein a Personal Identification Number (PIN) is used to initialize security-enhancement capabilities of the personal device the first time a user uses the personal device for security-enhancement of a user-created password in a session.

* * * * *